United States Patent [19]

Siewertsz van Reesema

[11] 3,793,193

[45] Feb. 19, 1974

[54] ION EXCHANGE

[76] Inventor: Nikolaas Hendrik Siewertsz van Reesema, Rotterdamseweg 119, Delft, Netherlands

[22] Filed: June 14, 1971

[21] Appl. No.: 153,034

[30] Foreign Application Priority Data
June 19, 1970 Netherlands...................... 7009021

[52] U.S. Cl......................... 210/30, 210/37, 210/38
[51] Int. Cl............................................. B01d 15/04
[58] Field of Search........................... 210/24, 30, 32

[56] References Cited
UNITED STATES PATENTS

| 3,351,549 | 11/1967 | Bloch | 210/24 |
| 3,414,509 | 12/1968 | Bloch | 210/32 |

Primary Examiner—Samih N. Zaharna
Assistant Examiner—Ivars Cintins
Attorney, Agent, or Firm—Brenner & Wray

[57] ABSTRACT

Dipolar organic compounds, such as ammonium bipolar carbamate, are used for exchanging and entraining ions in ion exchangers.

2 Claims, No Drawings

ION EXCHANGE

This invention relates to a method of exchanging and entraining ions in ion exchangers and for the regeneration of such ion exchangers.

The method according to the invention is characterized by the use of solutions of dipolar organic compounds for the exchange and entraining of the ions and for the regeneration of the exchangers.

There are dipolar organic compounds with a relatively large dipole moment, or in other words, a relatively large distance between the electrostatic charges.

I have now surprisingly found that these dipolar organic compounds are capable of both displacing or exchanging the ions from anion or cation exchangers and carrying away the ions exchanged with the percolating liquid.

When such a dipolar compound is represented by ABC, the charge distribution can be indicated as $^+ABC^-$. In this formula, B suggests a certain necessary length between the two poles.

Furthermore, the exchange columns will be coded:

CC    cation column and
   AC    anion column.

When the two columns have been charge by percolation of a 4% NaCl solution, the following charge distributions are obtained:
 $CC^{-+}Na$ and
 $AC^{+-}Cl$.

I have found that $^+ABC^-$ can displace or exchange, but also that in the percolating liquid the displaced $Na^+$ ion (in the case of CC) is immediately attracted by another molecule in the percolating liquid and entrained as $$Na^{+-}CBA^+$$

This percolate can now be acidified with HCl and, by evaporation, followed by incineration, converted into NaCl, which can be easily determined.

I have found that with an adequate exchanging capacity and a proper selection of the dimensions of the column and moreover the required quantity of percolating $^+ABC^-$, the quantity of NaCl cooresponds with the quantity of $Na^+$ originally constituting the charge of $CC^-$.

One example of a suitable dipolar organic compound is a commercially available product sold under the name of "Ammonii Carbonas" by ACF Farmaceutische Groothandel N.V. and N.V. Koninklijke Pharmaceutische Fabrieken v/h Brocades-Stheeman & Pharmacia, both of Amsterdam, Holland. The product is claimed to have the approximate composition $NH_4HCO_3$-$NH_4CO_2NH_2$, for which reason it is often referred to as ammonium hydrogen carbonate-carbamate. Analysis has shown, however, that the indicated formula cannot be correct, since the product does not exhibit the generation of carbon dioxide when a mineral acid is added. It dissolves in water to a concentration of about 15 percent by weight with pH 9. The product evaporates without decomposition when air is passed over the solution at room temperature. The product can be easily prepared by passing a stream of carbon dioxide slowly through a 25 percent solution of ammonia in water at room temperature. The reaction is exothermic, and when the reaction is completed, the mixture cools off. Owing to the heat generated the reaction product is largely evaporated, and it is condensed at colder places in crystalline form.

A possible formula which is in agreement with the dipolar character of the product is

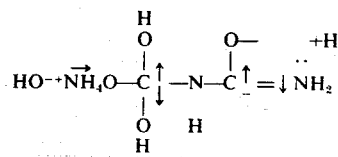

This product is referred to herein and in the accompanying claims as ammonium bipolar carbamate.

Another example is butene-2-al (croton aldehyde). In this case there is a so-called overlap.

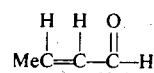

In this overlap $\pi$-electrons are movable above and below an imaginary plane with a flux to the oxygen of the carbonyl group.

In both cases there is a carbonyl group in combination with electron-supplying groups. Both exhibit the phenomenon of mesomery or of the displaceability of so-called movable $\pi$-electrons to the carbonyl groups.

In the ammonium bipolar carbamate molecule, the exchanging and entraining capacity can be demonstrated as follows.

EXAMPLE I

There was used 6.65 g insolubilized crystal humus (cf. Dutch Pat. application No. 7,009,020, describing the formation of epoxy groups in crystal humus described in Dutch patent application No. 6,708,717, which mentions the crystal humus, ammonium humus crystallate; the product acts as a cation exchanger). The column was charged with a 4 percent NaCl solution at pH 8 (approximately the pH of seat water). The percolating liquid was a solution of ammonium bipolar carbamate at pH 9 (the equilibrium pH in water).

The exchange was effected in 3 periods, in each of which 2 × 10 cc of a 14 percent solution of ammonium bipolar carbmate was percolated, here again represented by $^+ABC^-$. The percolation was effected in the following manner.

First introduce 10 cc in a suction funnel, switch on a high-vacuum pump, suck through very rapidly, and suck off completely. Repeat this immediately with 10 cc without vacuum, and then again suck off completely. In this manner the so-called "pore-NaCl" can be neglected. Of each period of 2 × 10 cc, the NaCl content in the percolate was determined by incineration. One period lasted about 6 minutes.

There was found:

| | |
|---|---|
| First period | 0.43 g NaCl |
| Second period | 0.23 g NaCl |
| Third period | 0.03 g NaCl |

Theoretically,
(3 × 58.5)/1080 × 6,65 = 1.08 g NaCl can be exchanged.

Consequently, in the first two periods, that is, in 12 minutes, (0.66 × 100)/1.08 = 61.1 percent is exchanged, whereafter there is apparently a steep decline in exchange.

It follows from the above that the exchanging capacity was amply sufficient. However, a relatively large suction funnel was used, so that the column was of low height, and the contact of $^+ABC^-$ with the ion exchanger was of short duration.

With the same quantity of cation exchanger, however, a much taller column can be made, so that the exchanging capacity can be well utilized, and the rate of throughflow can be increased, so that full exchange can be realized in about 6 minutes.

EXAMPLE II

Desalination of sea water and recovery of sea salt.

The apparatus consisted, for example, of a $CC^-$ and an $AC^+$, connected in parallel and disposed in vertical position. Initially these are in the condition
$CC^{-+}ABC^-$ and
$AC^{+-}CBA^+$.
First phase.

Through the two columns the same quantity of sea water flows. Half of the total volume of seawater, containing $Cl^{-+}ABC^-$, is entrained from CC to a buffer reservoir, called CC buffer, and half of the total volume of sea water containing $Na^{+-}CBA^+$ is entrained from AC to AC buffer.
Second phase.

Regeneration of the columns with $^+ABC^-$ solution to re-instate the condition $CC^{-+}ABC^-$ and
$AC^{+-}CBA^+$ and
also a discharge of $Na^{+-}CBA^+$ from $CC^-$ and
of $Cl^{-+}ABC^-$ from $AC^+$
to an apparatus in which NaCl is recovered and $^+ABC^-$ is regenerated.
Third phase.

Discharge of sea water and $^+ABC^-$ from CC and AC buffers, the sea water from the first phase from both columns being again passed through the columns. The percolate from both columns consisted of fresh water containing just $^+ABC^-$ in solution. It has been found that the $^+ABC^-$ can be recovered in a simple manner by evaporation, leaving the water.
Fourth phase.

The $Na^+$ and $Cl^-$ still present in the columns is percolated with $^+ABC^-$, and the percolates
$Na^{+-}CBA^+$ and
$Cl^{-+}ABC^-$
are re-introduced into the apparatus referred to in phase 2, in which $^+ABC^-$ is regenerated and sea salt is recovered. In the meantime the columns are again charges with $^+ABC^-$ for the next cycle.
Capacity of the columns.

It will be determined how large the columns should be to produce approximately 400 tons of fresh water per hour.

The duration of a cycle can be supposed to be 40 minutes.

In 40 minutes, $40/60 \times 400$ ton = 270 ton is produced. This quantity is produced jointly by CC and AC, namely, half by each.

By CC alone, 135 tons are produced in 40 minutes.

Approximately 135 tons of sea water are supplied and approximately $4/100 \times 135$ tons = 5.4 tons 4 percent NaCl solution are percolated in 40 minutes.

The exchanging capacity of the crystal humus is given, because 1 kg crystal humus can exchange 0,162 kg NaCl.

In order to exchange 5.4 tons NaCl with ABC, that is, with $CC^{-+}ABC^-$, $5400/0.162 \times 1$ kg exchanger = 33,333 kg or 33.33 tons are required.

The material in CC consists of porous but hard granules having a volume weight of about 0.8. Consequently, the volume is about 41.6 $m^3$. Accordingly, with a column 3 m tall, the cross-sectional area must be approximately 14 $m^2$. As stated before, the production per hour then becomes 400 tons of fresh water while the column have relatively moderate dimensions.

I claim

1. A process for the desalination of salt water by ion exchange which comprises passing salt water through a cation exchanging column and an anion exchanging column, which columns have been charged with an aqueous solution of ammonium bipolar carbamate, passing the percolate from the cation exchanging column through an anion exchanging column and the percolate from the anion exchanging column through a cation exchanging column, which columns have been charged with an aqueous solution of ammonium bipolar carbmate, and recovering desalinated water from the percolates thus produced.

2. Process according to claim 1, wherein the exchanging columns are regenerated by charging them with an aqueous solution of ammonium bipolar carbamate.

* * * * *